United States Patent Office 3,523,809
Patented Aug. 11, 1970

3,523,809
PROCESS FOR THE PREPARATION OF TITANIUM DIOXIDE PIGMENT
Raymond Gerard Holbein, Thann, France, assignor to Fabriques de Produits Chimiques de Thann et de Mulhouse, Thann, Haut-Rhin, France, a French body corporate
No Drawing. Filed Dec. 19, 1966, Ser. No. 602,474
Claims priority, application France, Dec. 23, 1965, 43,509
Int. Cl. C09c 1/36
U.S. Cl. 106—300                                15 Claims

ABSTRACT OF THE DISCLOSURE

The stability to light of titanium dioxide pigments, especially for use in melamine resin laminates, is improved by coating the particles with silica and magnesia, and optionally also alumina. The oxides may be precipitated on the pigment particles from aqueous solution at 50–80° C. Afterwards the coated pigment is calcined at say 600°–700° C.

---

The present invention relates to titanium dioxide pigments having a good stability with respect to undesirable photochemical reactions in laminates based inter alia on melamine-formaldehyde resins.

It is known that the titanium dioxide pigments are the origin of appreciable photochemical reactions when they are introduced into reactive media, e.g. synthetic resin laminates, and exposed to light. These reactions quickly cause deterioration in the initial colouring of the pigments and must be avoided to the highest possible degree.

The present invention has for an object the production of new titanium dioxide pigments of good colour stability in the sense indicated above.

According to the invention titanium dioxide pigments of good stability are obtained by a process which comprises depositing a coating of silicon dioxide and magnesium oxide, and optionally also aluminum oxide, on a titanium dioxide pigment and calcining the coated pigment at a temperature of 600° C. or above, preferably 600°–700° C.

It should be understood that the terms "silicon dioxide," "magnesium oxide" and "aluminium oxide" are used conventionally, i.e. without any necessary implication on the one hand that the oxides are present, wholly or in part, in the free state, or on the other that they are wholly combined, e.g. as magnesium and aluminium silicates.

Preferably the oxides are deposited on the pigment particles from aqueous solution, as by forming a suspension of the pigment in water to which soluble salts of silica, magnesium, and optionally aluminium are successively added, the pH of the solution being suitably adjusted to ensure that the desired precipitation takes place. It is highly advantageous, and this forms an important preferred feature of the invention, to "digest" the suspension of titanium dioxide in a silicate solution at an elevated temperature, e.g. 50° C. or above, before adding the magnesium, and if desired aluminium.

The coated pigment is separated from the suspension and thoroughly washed, after which it is calcined at a temperature of 600° C. or above such as is used for calcining untreated titanium dioxide pigments.

In a preferred method of carrying out the invention a titanium dioxide, generally a rutile, pigment is suspended in water containing a water-soluble silicate, usually sodium silicate, or to which such a silicate is subsequently added. The amount of silicate, reckoned as $SiO_2$, may be between about 1 and 5%, and especially 2–3%, on the weight of the titanium dioxide. The suspension may then be warmed, e.g. to about 50–80° C., and especially to 55–65° C., while kept in constant movement by stirring or otherwise. After a period of about 5 minutes or more, e.g. 5–30 minutes, a soluble magnesium salt, conveniently magnesium sulphate, is added, preferably in amount equivalent to about 0.5–2% MgO, and preferably 0.75–1.25% and especially about 1% MgO, on the weight of the titanium dioxide.

A neutralising agent, usually sodium carbonate, is then added, preferably in amount approximately equivalent to the reckoned MgO content of the suspension, which is then allowed to stand at room temperature or a higher temperature, e.g. up to 75° C. The pigment is then separated from the suspension, e.g. by decantation, filtration or centrifuging, and very thoroughly washed. It is then calcined, e.g. at 600° C. for 6–8 hours.

Stabilised titanium dioxide pigment obtained by the process of the invention can be crushed or micronised, and is very suitable for use in synthetic resin laminates, including laminates containing melamine-formaldehyde resins.

It is preferable to treat the titanium dioxide also with an aluminium compound. This may with advantage be done by adding an aluminium salt, usually aluminium sulphate, to the dispersion after adding the neutralising agent, the amount of aluminium salt being sufficient to bring the pH of the dispersion to 7–8.

The following examples illustrate the invention.

EXAMPLE 1

To 3 litres of a suspension of untreated rutile containing 500 g./l. of $TiO_2$, there are added while stirring 1172 cc. of a sodium silicate solution containing 32 g./l. of $SiO_2$, and the suspension is brought to 60° C.

Agitation of the heated suspension is continued for about 10 minutes and then 300 cc. of a magnesium sulphate solution containing an amount equivalent to 50 g./l. of MgO are added.

The dispersion is then neutralised with sodium carbonate, and left to stand for about 10 minutes at room temperature. The pigment is then separated, e.g. by centrifuging, and thoroughly washed, after which it is introduced into a furnace at 600° C., in which it is calcined for 6 to 8 hours. At the outlet from the furnace, the pigment is micronised.

The stability of the pigment thus obtained is very good. The stability can be measured as follows: 20% of titanium dioxide is incorporated in paper pulp, and a moulded element is formed, dried, coated with melamine-formaldehyde resin, and pressed to a laminated sheet.

Two sheets are prepared, one containing the titanium dioxide to be tested, and the other a conventional untreated titanium dioxide as control.

The two sheets are then subjected to the effects of a weatherometer, and the variations in colouring of the exposed part relatively to a part concealed beneath the metallic support is measured as a function of time.

The titanium dioxide pigment obtained according to the invention does not become coloured, whereas the conventional titanium dioxide pigments are coloured to a greater or less degree.

The stability of the pigment treated by the process of the invention can also be compared with the stability of the standard commercial pigment which has undergone a surface treatment with silica and alumina without recalcination.

It is possible to establish arbitrarily a stability scale of which the zero corresponds to the stability of the conventional pigment.

On this scale, the stability of the pigment obtained in Example 1 is 70%.

EXAMPLE 2

To 3 litres of an untreated rutile suspension containing 500 g./l. of TiO$_2$, there are added, as in Example 1, 1172 cc. of a sodium silicate solution and 300 cc. of a magnesium sulphate solution.

Instead of the sodium carbonate, 300 cc. of a 100 g./l. sodium hydroxide solution are introduced, and then sufficient aluminium sulphate to bring the pH to 7.5–8.

The pigment is then separated and washed, and calcined at 600° C. as in Example 1.

The stability of the pigment which is obtained, on the stability scale defined in Example 1, is 80%.

I claim:

1. Process for the production of a light-stable titanium dioxide pigment, which comprises heating with stirring a suspension of pigment titanium dioxide in an aqueous solution of a water-soluble metal silicate, then adding a water-soluble magnesium salt to the suspension, neutralizing the suspension, allowing it to stand, and subsequently separating the pigment from the suspension, washing it, and calcining it at a temperature of 600°–700° C.

2. Process according to claim 1, wherein the suspension of the titanium dioxide in the silicate solution is heated to a temperature of 50°–80° C. for at least 5 minutes before the magnesium salt is added.

3. Process according to claim 1, wherein the suspension of the titanium dioxide in the silicate solution is heated to a temperature of 55°–65° C. for 5–30 minutes before the magnesium salt is added.

4. Process according to claim 1, wherein the silicate solution contains 1–5% of SiO$_2$, calculated on the weight of the titanium dioxide.

5. Process according to claim 1, wherein the magnesium salt solution contains 0.5–2% MgO, calculated on the weight of the titanium dioxide.

6. Process according to claim 2, wherein the silicate solution contains 2–30% of SiO$_2$, and the magnesium salt solution contains 0.75–1.25% of MgO, both calculated on the weight of the titanium dioxide.

7. Process according to claim 1, wherein the washed pigment is calcined at 600°–700° C. for 6–8 hours.

8. Process according to claim 1, wherein after the neutralization an aqueous solution of a water-soluble aluminium salt is added to the suspenson.

9. Process according to claim 8, wherein sufficient of the aluminium salt is added to bring the pH of the suspension to 7–8.

10. Process according to claim 6, wherein the metal silicate is a sodium silicate and the magnesium salt is magnesium sulphate.

11. Process according to claim 10, wherein after the neutralization sufficient of an aqueous solution of aluminium sulphate is added to bring the pH of the suspension to 7–8.

12. Light-stable titanium dioxide pigment having a coating of a calcined mixture of silicon dioxide and magnesium oxide.

13. Light-stable titanium dioxide pigment having a coating of a calcined mixture of silicon dioxide, magnesium oxide and aluminium oxide.

14. Pigments according to claim 12, wherein the coating comprises 1–5% of silicon dioxide and 0.5–2% of magnesium oxide, both calculated on the weight of the titanium dioxide.

15. Pigments according to claim 13, wherein the coating comprises 1–5% of silicon dioxide and 0.5–2% of magnesium oxide, both calculated on the weight of the titanium dioxide.

References Cited

UNITED STATES PATENTS 2,378,790    6/1945    Robertson _____ 106—300

TOBIAS E. LEVOW, Primary Examiner

H. M. S. SNEED, Assistant Examiner

U.S. Cl. X.R.

106—308; 162—135, 166, 181